United States Patent [19]

van Helmond

[11] Patent Number: 5,252,653
[45] Date of Patent: Oct. 12, 1993

[54] POLYMER MIXTURE AND ARTICLES FORMED THEREFROM

[75] Inventor: Johannes van Helmond, Bergen op Zoom, Netherlands

[73] Assignee: General Electric Company, Pittsfield, Mass.

[21] Appl. No.: 979,947

[22] Filed: Nov. 23, 1992

[51] Int. Cl.$^5$ .................. C08K 3/32; C08L 69/00; C08L 67/02

[52] U.S. Cl. .................. 524/409; 524/412; 524/417; 525/67; 525/439

[58] Field of Search .................. 524/409, 412, 417; 525/67, 439

[56] References Cited

U.S. PATENT DOCUMENTS

| | | | |
|---|---|---|---|
| 3,953,539 | 4/1976 | Kawase | 524/417 |
| 4,239,677 | 12/1980 | Dieck | 525/439 |
| 4,532,290 | 7/1985 | Jaquiss | 524/417 |
| 4,981,898 | 1/1991 | Bassett | 524/417 |

FOREIGN PATENT DOCUMENTS 264659  11/1988  Japan .................. 524/417

*Primary Examiner*—David J. Buttner

[57] ABSTRACT

The invention relates to polymer mixtures which comprise a polyalkylene phthalate and an aromatic polycarbonate and/or a brominated aromatic carbonate oligomer, polymer or copolymer. It has been found that zinc or calcium hydrogen phosphates are good transesterification inhibitors. An important advantage of the said inhibitors is that they do not condense or hardly condense to polyphosphates and that they do not negatively influence the impact strength of the polymer mixture.

10 Claims, No Drawings

POLYMER MIXTURE AND ARTICLES FORMED THEREFROM

The invention relates to a polymer mixture which comprises
(A) a polyalkylene phthalate
(B) an aromatic polycarbonate or a brominated aromatic carbonate oligomer, polymer or copolymer or a mixture of a brominated aromatic carbonate oligomer, polymer or copolymer and a non-brominated aromatic polycarbonate, and
(C) a transesterification inhibitor.

The invention also relates to articles formed from the polymer mixture according to the invention.

Polymer mixtures which comprise a polyalkylene phthalate, an aromatic polycarbonate and a transesterification inhibitor are generally known, for example, from U.S. Pat. No. 3,953,539. For example, according to U.S. Pat. No. 3,953,539, the salts may be used of a large number of different metals with phosphorus-containing acids. As specific examples are mentioned salts of sodium, calcium, aluminium, potassium and magnesium.

It has unexpectedly been found that hydrogen phosphates of zinc or calcium show an important advantage compared with the corresponding sodium salt and compared with the orthophosphates. As a matter of fact, sodium dihydrogen phosphate shows the disadvantage that under the conventional processing conditions of the polymer mixture it easily condenses to agglomerates which, upon extrusion or injection-moulding of the polymer mixture, form annoying deposits. The disadvantage of zinc phosphate is that it reduces the activity of polymeric additives for the improvement of the impact strength, such as may be added to the polymeric mixtures according to the invention.

Therefore, a zinc or calcium hydrogen phosphate must be used as a transesterification inhibitor in the polymer mixture according to the invention. Suitable hydrogen phosphates are zinc -bis-(dihydrogen phosphate) and calcium -bis-(dihydrogen phosphate.)

The polymer mixture according to the invention comprises at any rate one or more of the following constituents:
(A) a polyalkylene phthalate
(B) a non-brominated aromatic polycarbonate or a brominated aromatic carbonate oligomer, polymer or copolymer or a mixture of a brominated aromatic carbonate oligomer, polymer or copolymer and a non-brominated aromatic polycarbonate and
(C) a hydrogen phosphate of zinc or calcium as a transesterification inhibitor.

In addition to the constituents mentioned herein before, the polymer mixture may comprise conventionally used additives. By way of example may be mentioned in particular polymeric additives to improve the impact strength, flame-retardant additives, reinforcing and non-reinforcing fillers, oxidation stabilisers, mould-release agents, processing additives, dyes and/or pigments. Moreover, the polymer mixture, in particular when it comprises a flame-retardant additive, for example, a brominated aromatic carbonate oligomer, polymer or copolymer, may also comprise antimony oxide as an auxiliary substance.

(A) POLYALKYLENE PHTHALATE

The invention relates to polymer mixtures which comprise a polyalkylene phthalate with units derived from an alkanediol and an aromatic dicarboxylic acid. The polyalkylene phthalate may comprise units derived from one or more alkanediol compounds. The polyalkylene phthalate also comprises units derived from one or more aromatic dicarboxylic acids. In addition to the alkanediol, the poly-alkylene phthalate may comprise units derived from one or more other diol compounds or polyol compounds.

Polyalkylene phthalates generally comprise an excess of units derived from an alkanediol with respect to the optionally present units derived from other diol compounds or polyol compounds. Suitable alkanediol compounds are, for example, ethanediol or butane-1,4-diol. In addition to units derived from aromatic dicarboxylic acids the polyalkylene phthalate may also comprise units derived from other dicarboxylic acids or polycarboxylic acids. However, the greater part of the units derived from acids is preferably derived from an aromatic dicarboxylic acid. Suitable aromatic dicarboxylic acids are terephthalic acid and isophthalic acid, preferably terephthalic acid.

As a polyalkylene phthalate is preferably used a polyalkylene phthalate having more than 70 mol % of units derived from terephthalic acid and butane-1,4-diol. It is also possible to use a mixture of two or more different polyalkylene phthalates.

(B) Polycarbonate

The polymer mixture according to the invention comprises an aromatic polycarbonate or a brominated aromatic carbonate oligomer, polymer or copolymer or a mixture of a brominated aromatic carbonate oligomer, polymer or copolymer and a non-brominated aromatic polycarbonate.

Aromatic carbonates are polymers known per se. They are generally prepared by reacting a dihydric phenol compound with a carbonate precursor, for example, phosgene, a halogen formiate or a carbonate ester. Aromatic carbonates are polymers which comprise units of the formula

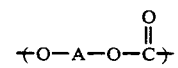

wherein A is a bivalent aromatic radical which is derived from the dihydric phenol used in the preparation of the polymer. Mononuclear or polynuclear aromatic compounds which comprise two hydroxy radicals each directly bonded to a carbon atom of an aromatic nucleus may be used as dihydric phenols in the preparation of the aromatic polycarbonates.

Examples of suitable dihydric phenols are:
2,2-bis-(4-hydroxy phenyl)propane; hydroquinone; resorcinol; 2,2-bis-(4-hydroxy phenyl)pentane;
2,4'-(dihydroxy diphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane; 2,2-dihydroxyphenyl;
2,6-dihydroxynaphthalene;
bis-(4-hydroxydiphenyl)sulphone;

bis-(3,5-diethyl-4-hydroxyphenyl)sulphone;
2,2-bis-(3,5-dimethyl-4-hydroxyphenyl)propane;
2,4'-dihydroxyyphenyl sulphone;
5'-chloro-2,4'-dihydroxydiphenyl sulphone;
bis-(4-hydroxyphenyl)diphenyl sulphone; 4'4'-dihydroxy diphenyl ether; 4,4'-dihydroxy-3,3'-dichlorodiphenyl ether; 4,4'-dihydroxy-2,5-dihydroxy diphenyl ether.

Other likewise suitable dihydric phenols are disclosed in U.S. Pat. Nos. 2,999,835; 3,038,365; 3,334,154 and 4,131,575.

The aromatic polycarbonates may be prepared in a manner known per se: for example, by reacting a dihydric phenol with a carbonate precursor, for example, phosgene. For this purpose reference may be made to the United States Patent Specifications mentioned hereinbefore and to U.S. Pat. No. 4,018,750 and 4,123,426. They may also be prepared by a transesterification as described in U.S. Pat. No. 3,153,008.

The branched polycarbonates known per se as described, for example, in U.S. Pat. No. 4,001,184 are also suitable.

Suitable aromatic polycarbonates are also the so-called polyester carbonates which are obtained by carrying out the polymerisation reaction in the presence of an ester precursor, for example, a difunctional ester-forming derivative thereof. These polyester carbonates have ester compounds and carbonate compounds in the polymeric chain. Polyester carbonates are described, for example, in U.S. Pat. No. 3,169,121.

It is also possible to use a mixture of various polycarbonates as mentioned hereinbefore as an aromatic polycarbonate in the polymer mixtures according to the invention.

Brominated aromatic carbonate oligomer, polymer or copolymer: the polymer mixture according to the invention may comprise a brominated aromatic carbonate oligomer, polymer or copolymer instead of the non-brominated aromatic polycarbonate. It is also possible to replace a part of the non-brominated aromatic polycarbonate by a brominated aromatic carbonate. In that case the polymer mixture according to the invention comprises a mixture of a brominated aromatic carbonate oligomer, polymer or copolymer and a non-brominated aromatic polycarbonate. Brominated aromatic carbonate oligomers, polymers or copolymers are known per se as flame-retardants. Brominated aromatic carbonate oligomers, polymers, copolymers having a weight-averaged molecular weight between 500 and 70,000 may be used in the polymer mixture according to the invention. Suitable brominated aromatic carbonate oligomers, polymers or copolymers are described, for example, in U.S. Pat. No. 3,936,400 and U.S. Pat. No. 3,915,926.

(C) Transesterification inhibitor

The polymer mixture according to the invention comprises a hydrogen phosphate, such as zinc or calcium (monohydrogen phosphate) or zinc or calcium -bis-(dihydrogen phosphate) as a transesterification inhibitor. The use of the said inhibitors provides the following advantages: a good suppression of the transesterification; no or hardly any influence on the activity of polymeric constituents to improve the impact strength when these are present in the polymer mixture (this in contrast with zinc ortho phosphate); the inhibitor used is a solid and as a result can more easily be compounded in an extruder than other known liquid inhibitors, for example, phosphoric acid and phosphorous acid; no discolouring (yellowing) of the polymer mixture as may occur when phosphoric acid is used and no greying when antimony oxide is present (this does occur when phosphorous acid is used as an inhibitor). Compared with sodium dihydrogen phosphate, the inhibitor as used in the polymer mixture according to the invention provides the important advantage that no polycondensation of the phosphate occurs and hence no or hardly any deposits occur in the extrusion or injection-moulding.

In addition to the constituents mentioned herein before, the polymer mixture according to the invention may comprise any constituents conventionally used for such polymer mixtures. In particular may be mentioned the polymers which are generally known to improve the impact strength. These include in the first instance copolymers and graft copolymers which comprise rubber-like constituents. Examples are the core-shell graft polymers having a rubber-like core on which one or more monomers have been grafted.

Examples of further suitable constituents for the polymer mixture according to the invention are the following: flame-retardant additives other than the brominated aromatic carbonate oligomers, polymers or copolymers, reinforcing and non-reinforcing fillers, oxidation stabilisers, mould-release agents, processing additives, dyes and/or pigments mentioned hereinbefore.

The invention will now be described in greater detail with reference to the ensuing specific examples.

EXAMPLES I, II AND III; COMPARATIVE EXAMPLES A AND B

In the preparation of various polymer mixtures the following constituents were used:
PBT: a polybutylene terephthalate having an intrinsic viscosity of 120 ml/g measured in a phenol-(1,1,2,2-tetrachloroethane) mixture (60:40) at 25° C.
PC: an aromatic polycarbonate derived from phosgene and bisphenol A having an intrinsic viscosity of 58 ml/g measured in methylene chloride at 25° C.
PC-Br: a brominated aromatic carbonate copolymer derived from tetrabromobisphenol A, bisphenol A and phosgene having a bromine content of 22% by weight, having an intrinsic viscosity of 40 ml/g measured in methylene chloride at 25° C.
I.M.: a core-shell graft copolymer having a rubber-like "backbone" consisting for the greater part of a butadiene rubber on which methyl methacrylate and styrene have been grafted.
$Sb_2O_3$: a mixture of 85% by weight of $Sb_2O_3$ and 15% by weight of a carrier polymer.
PTFE: a mixture of polytetrafluoroethylene (20% by weight) and a non-brominated aromatic polycarbonate =: (80% by weight).
Add.: a conventionally used antioxidation stabiliser and a mould-release agent.
Inh.1.: finely ground zinc phosphate having a particle size of 1.4 micrometers; $(Zn)_3(PO_4)_2.2H_2O$. An inhibitor which was used for comparative experiments.
Inh.2: zinc -bis-(dihydrogen phosphate) as inhibitor according to the invention; $Zn(H_2PO_4)_2.2H_2O$.
Inh.3: calcium -bis-(dihydrogen phosphate) as inhibitor according to the invention $Ca(H_2PO_4)_2$.

The constituents mentioned hereinbefore in the quantities as indicated in the table hereinafter were compounded in a double-screw extruder, adjusted at an average temperature of 240° C., extruded and chopped up to pellets. Test pieces were manufactured from the resulting pellets by injection-moulding to determine the following properties: the elongation at fracture (according to ASTM D 638); the notch impact strength according to Izod (ASTM D256) and the melt viscosity index (MVI) at 250° C. under a load of 50N (according to ISO 1133). The test rods were injection-moulded under normal conditions, i.e. at an average adjusted temperature of 260° C. and a residence time in the cylinder of the injection-moulding machine of 2 minutes. Test rods were also injection-moulded to determine the Vicat value according to ISO R 306 B/120. The Vicat value was determined of rods which were injection-moulded in the manner described hereinbefore, and of test rods which were injection-moulded under extra heavy conditions (average adjusted temperature 280° C. and a residence time of 2 minutes). When a transesterification occurs this results in a decrease of the Vicat value; the absolute value of the decrease is a measure of the transesterification. The lower the said value, the smaller the transesterification. The Vicat value itself, after injection-moulding under normal conditions, is also an indication for a possible transesterification. The higher the said value, the smaller the transesterification will have been.

The found properties have also been recorded in the table hereinafter.

TABLE

| Example Composition (parts by weight) | A * | B | I | II | III |
|---|---|---|---|---|---|
| PBT | 54.8 | 54.2 | 54.7 | 54.5 | 54.6 |
| PC | 15 | 15 | 15 | 15 | 15 |
| PC-Br | 16 | 16 | 16 | 16 | 16 |
| $Sb_2O_3$ | 3.5 | 3.5 | 3.5 | 3.5 | 3.5 |
| I.M. | 10 | 10 | 10 | 10 | 10 |
| PTFE | 0.15 | 0.15 | 0.15 | 0.15 | 0.15 |
| Add | 0.6 | 0.6 | 0.6 | 0.6 | 0.6 |
| Inh.1 | — | 0.6 | — | — | — |
| Inh.2 | — | — | 0.1 | 0.3 | — |
| Inh.3 | — | — | — | — | 0.2 |
| Properties | | | | | |
| Izod impact strength (J/m) notched | 720/920 | 260 | 640 | 670 | 720 |
| MVI (ml per 10 min.) | | | | | |
| after 4 min. | 13/7.1 | 12.5 | 11.5 | 10 | 11 |
| after 8 min. | 15.4/7.2 | 15 | 14 | 12 | 12 |
| after 12 min. | 15.7/7.0 | 17 | 16 | 13 | 13 |
| Vicat value (°C.) | | | | | |
| after "normal" injectionmoulding | 141.2/142 | 145.7 | 147.5 | 146.5 | 147. |
| after injection-moulding under aggravated conditions | 138.6/122 | 145.4 | 146.5 | 147 | 146. |
| change in Vicat | 2.6/20 | 0.3 | 1 | 0.5 | 0. |

* The composition according to example A has been prepared twice. Each of them has been tested seperately. The values for both compositions have been indicated.

It may be seen from the table that inhibitors 2 and 3 have a good inhibiting effect; the decrease of the Vicat value is small and the Vicat value itself is comparatively high. Inhibitors 2 and 3 according to the invention further hardly showed any detrimental influence on the activity of the polymer which has been added to improve the impact strength. This appears from the favourable value for the impact strength according to Izod. Moreover, no deposits were formed during molding when inhibitors 2 and 3 were used.

In similar experiments with sodium dihydrogen phosphate deposits were formed.

I claim:
1. A polymer mixture which comprises
   (A) a polyalkylene phthalate
   (B) a non-brominated aromatic polycarbonate or a brominated aromatic carbonate oligomer, polymer or copolymer or a mixture of a brominated aromatic carbonate oligomer, polymer or copolymer and a non-brominated aromatic polycarbonate and
   (C) a transesterification inhibitor, in which the polymer mixture comprises a hydrogen phosphate of zinc or calcium as a transesterification inhibitor.
2. A polymer mixture as claimed in claim 1, wherein the transesterification inhibitor is present in a quantity from 0.01 to 5 parts by weight per 100 parts by weight of the sum of constituent A and constituent B.
3. A polymer mixture as claimed in claim 1 wherein the transesterification inhibitor is zinc -bis-(dihydrogen phosphate).
4. A polymer mixture as claimed in claim 1 wherein the transesterification inhibitor is calcium -bis-(dihydrogen phosphate).
5. A polymer mixture as claimed in claim 1, wherein the weight ratio of constituent A to constituent B is between 5:95 and 95:5.
6. A polymer mixture as claimed in claim 1, wherein the polymer mixture comprises a polyalkylene phthalate having more than 70 mol % of units derived from terephthalic acid and butane-1,4-diol.
7. A polymer mixture as claimed in claim 1, wherein the polymer mixture comprises a brominated aromatic carbonate oligomer, polymer or copolymer having a weight-averaged molecular weight from 500 to 70,000.
8. A polymer mixture as claimed in claim 1, wherein the polymer mixture comprises a brominated aromatic carbonate oligomer, polymer or copolymer and an antimony oxide.
9. A polymer mixture as claimed in claim 1, wherein the polymer mixture moreover comprises a polymer for improving the impact strength.
10. Articles formed from the polymer mixture as claimed in claim 1.

* * * * *